United States Patent [19]
Grenier

[11] 4,210,309
[45] Jul. 1, 1980

[54] FLOW CONTROL MECHANISM FOR FLUSH VALVE

[75] Inventor: Wilfred J. Grenier, Rutland, Mass.

[73] Assignee: General Industries, Inc., Rutland, Mass.

[21] Appl. No.: 932,362

[22] Filed: Aug. 9, 1978

Related U.S. Application Data

[63] Continuation-in-part of Ser. No. 786,276, Apr. 11, 1977, abandoned.

[51] Int. Cl.² ............................................. F16K 31/385
[52] U.S. Cl. ........................................ 251/35; 251/44
[58] Field of Search .................... 251/45, 34, 35, 44

[56] References Cited

U.S. PATENT DOCUMENTS

| | | | |
|---|---|---|---|
| 2,000,297 | 5/1935 | Putnam | 251/34 |
| 2,087,049 | 7/1937 | Shanley | 251/34 X |
| 2,122,189 | 6/1938 | Ward | 251/45 X |
| 2,183,601 | 12/1939 | White | 251/34 X |
| 3,010,691 | 11/1961 | Canfield | 251/34 X |
| 3,367,621 | 2/1968 | Griswold | 251/42 X |

*Primary Examiner*—Arnold Rosenthal
*Attorney, Agent, or Firm*—Joseph S. Iandiorio

[57] ABSTRACT

In a flush valve having a housing, a movable partition sealingly engaging the housing and defining a primary chamber and a control chamber, an inlet port in the primary chamber and an outlet port in the primary chamber, a valve element connected with the partition for closing the outlet port, an actuator mechanism including an actuator valve for venting the control chamber, and an actuator member for operating the actuator valve, the improvement including a flow control mechanism including an auxiliary chamber communicating with the control chamber through the actuator valve; a flow regulating outlet communicating with the outlet port and the auxiliary chamber for discharging fluid vented through the actuator valve; a flow regulating inlet in the auxiliary chamber for conducting into the auxiliary chamber, when the flush valve is open and the valve element is separated from the outlet port, a portion of the fluid passing from the inlet port to the outlet port; and a unidirectional flow regulator valve for permitting fluid flow through the flow regulating inlet into the auxiliary chamber but preventing fluid flow through the flow regulating inlet out of the auxiliary chamber.

8 Claims, 14 Drawing Figures

4,210,309

FLOW CONTROL MECHANISM FOR FLUSH VALVE

CROSS REFERENCE

This application is a Continuation in Part of co-pending U.S. application Ser. No. 786,276, filed on Apr. 11, 1977, now abandoned.

FIELD OF THE INVENTION

This invention relates to a flow control mechanism for a flush valve.

BACKGROUND OF INVENTION

Conventional flush valves used with water closets, urinals and the like are typically not designed to deliver the same fixed flow volume of water during each flushing cycle independent of the line pressure to which they are subject. That is, typically with such flush valves, as the line pressure increases the amount of water discharged during a flushing cycle increases. This causes problems. First, with increase in pressure water is wasted, since any water discharged in addition to a predetermined required flushing volume is unnecessary. Second, when the line pressure decreases, the volume of water discharged during the flushing action decreases and may be insufficient to fully perform the flushing action and empty the water closet or urinal. In order to overcome this problem, certain flush valves may be purchased with a second, separate unit, which includes an adjustment feature. This requires the added expense inherent in the purchase of the second unit, and also the expense of the additional installation work which must be done by a plumber. Installation services may typically be a significant factor in the overall cost. Perhaps even more important, however, is the fact that such units must be set by the installer/plumber at the time of installation so that they produce sufficient volume of water for each flushing cycle. This leaves to the plumber the decision of just how much water is sufficient to complete a flushing cycle. In addition, the adjustment is made for the line pressure which is the line at the moment that the adjustment is made. Subsequent fluctuations in line pressure will cause variations in the discharge volume, since these fluctuations impose pressures other than the specific pressure for which the adjustment was made.

SUMMARY OF INVENTION

It is therefore an object of this invention to provide an improved, simplified and inexpensive flow control mechanism.

It is a further object of this invention to provide such a flow control mechanism which is contained in the flush valve.

It is a further object of this invention to provide such a flow control mechanism which is automatically self-adjusting in response to pressure applied.

The invention may be applied in a flush valve having a housing, a moveable partition sealingly engaging the housing and a primary chamber and a control chamber. There is an inlet port and an outlet port in the primary chamber; a valve element connected with the partition closes the outlet port. An actuator mechanism includes an actuator valve for venting the control chamber and an actuator member for operating the actuator valve.

The invention features a flow control mechanism including an auxiliary chamber communicating with the control chamber through the actuator valve. A flow regulating outlet communicates with the outlet port and the auxiliary chamber for discharging fluid vented through the actuator valve. A flow regulating inlet is located in the auxiliary chamber for conducting into the auxiliary chamber, when the flush valve is open and the valve element is separated from the outlet port, a portion of the fluid passing from the inlet port to the outlet port. There is a unidirectional flow regulator valve for permitting fluid flow through the flow regulating inlet into the auxiliary chamber and preventing fluid flow through the flow regulating inlet out of the auxiliary chamber.

The flow control mechanism may include a metering mechanism interconnected with the passage between the control chamber and the primary chamber, for controlling flow through the passage as a function of the differential pressure between the primary chamber and the auxiliary chamber. The metering mechanism may also include a tapered metering rod slidable in the passage in response to movement of the partition. Second biasing means holds the metering rod in fixed relationship to the housing and urges the metering rod out of the passage.

Alternatively, the metering mechanism may include a double-acting metering piston having one end subject to the pressure in the primary chamber and the other end subject to the pressure in the auxiliary chamber. A metering rod driven by the double-acting metering piston is slidable in the passage and controls the flow through the passage in response to the pressure differential between the primary and auxiliary chambers as experienced by the double-acting metering piston.

A compensator mechanism may be used for operating the actuator control mechanism over a predetermined range of pressure at the inlet port, by adjusting the longitudinal driving distance between the actuator control mechanism and the partition.

DISCLOSURE OF PREFERRED EMBODIMENT

Other objects, features and advantages will occur form the following description of a preferred embodiment and the accompanying drawings, in which.

Figure 1:
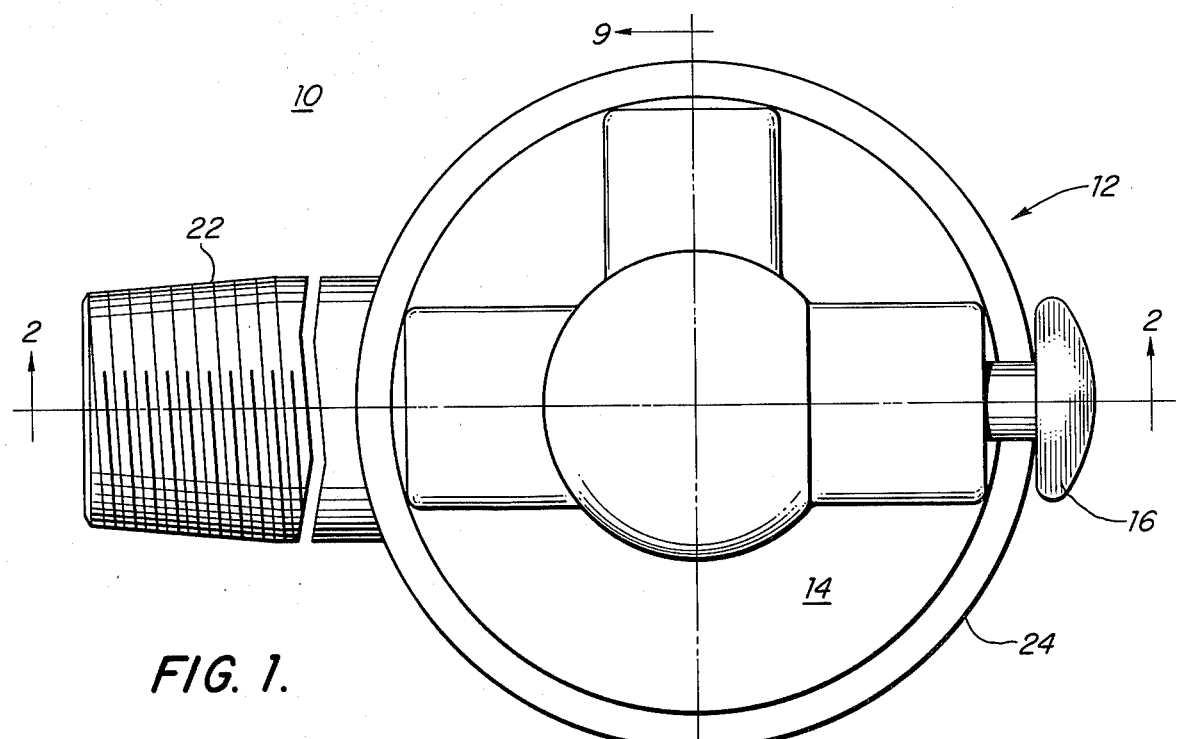
FIG. 1 is a plan view of a flush valve according to this invention.
Figure 2:
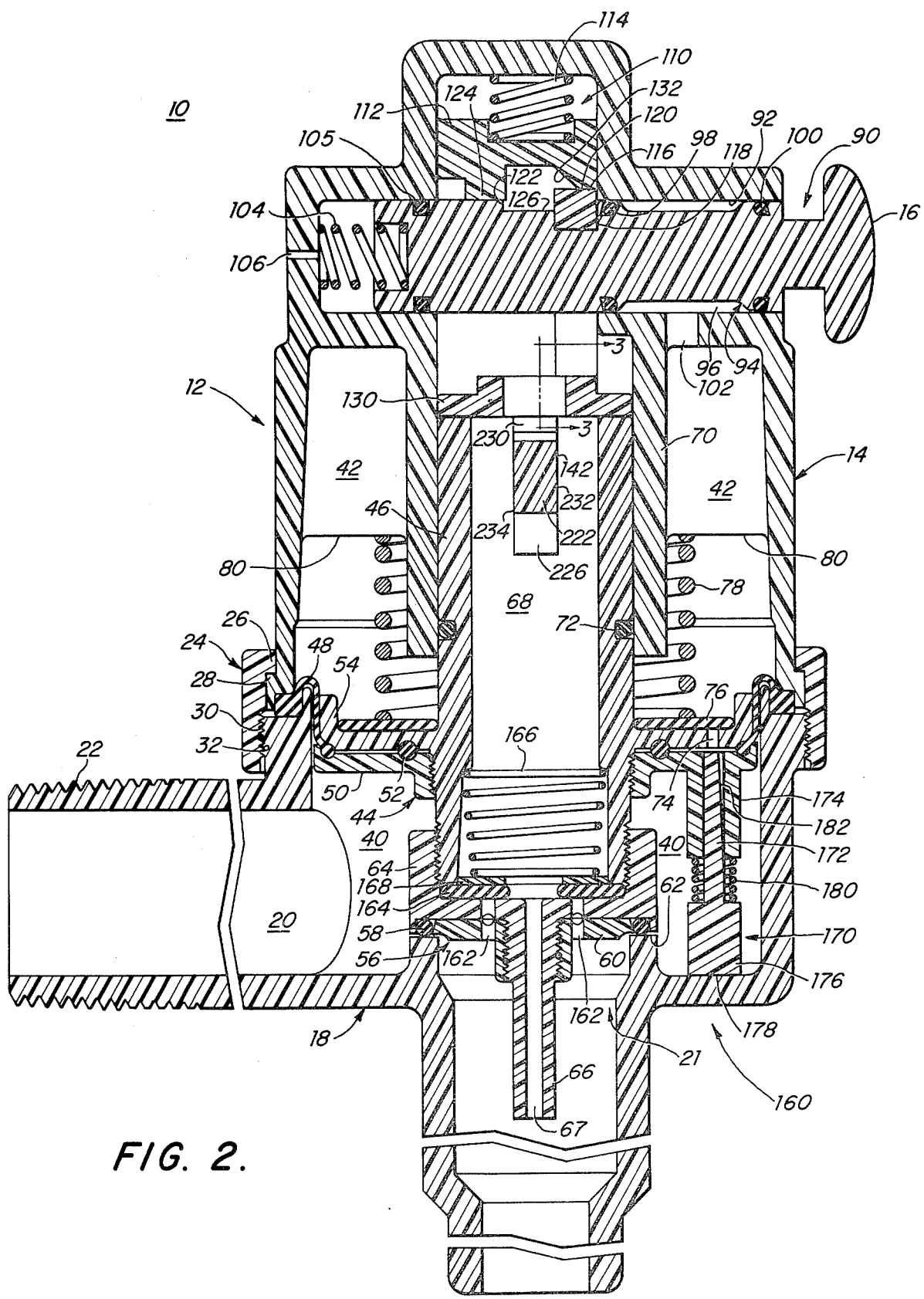
FIG. 2 is a sectional view taken along line 2—2 of FIG. 1.

There is shown in FIG. 1 a flush valve 10 according to this invention including a housing 12, including an upper part or cap 14 which contains the actuator member or handle 16, and a lower part or base 18, FIG. 2, which contains an inlet port 20 with a threaded lateral inlet extension 22 and outlet port 21. Cap 14 and base 18 are locked together by a threaded locking ring 24. Locking ring 24 has a locking portion 26 which engages a locking lip 28 on cap 12 and threads 30, which engage threads 32, on base 18. When locking ring 24 is loosened, cap 14 and base 18 may be relatively rotated to arrange actuator handle 16 and inlet extension 22 to any relative azimuthal orientation, as required by a particular installation. The cap and base will then be held in this orientation by the securing of locking ring 24.

Housing 12 is separated into two main chambers, primary chamber 40 and control chamber 42, by partition 44. Partition 44 includes hollow slide member 46, rolling diaphragm 48, which slidably, sealingly supports slide 46 with respect to housing 12, and a diaphragm locking plate 50, which threadably engages slide 46 and compresses the inner end of diaphragm 48 and "O" ring 52 against flange 54 of slide 46. The other end of diaphragm 48 is gripped between cap 14 and base 18 by means of locking ring 24. At its lower end partition 44 includes a valve element 56 including "O" ring 58 and "O" ring locking plate 60, which holds "O" ring 58 in the proper position for contacting the seat 62 of outlet port 21. Outlet port valve element 56 is carried by flow regulator member 64, which is threadably engaged with the lower end of slide member 46 and includes a depending tubular extension 66 which threadably engages with locking plate 60 and contains duct 67 which connects auxiliary chamber 68 formed within slide 46 with outlet port 21, and which functions as a flow regulating outlet. Slide 46 is slidable in guide 70, which is a portion of cap 14, and is sealingly engaged with guide 70 by means of "O" ring 72.

Passage or hole 74 in flange 54 of slide 46 and plate 50 interconnects primary chamber 40 and control chamber 42 and enables equalization of pressure therebetween. A unilateral valve member, resilient washer 76, covers the end of hole 74 in control chamber 42 and is urged in the direction to close hole 74 by a biasing member, spring 78, which contacts webs 80 of cap 14 and also acts to urge slide 46 downward and to keep valve element 56 closed on outlet port 21.

Actuator handle 16 forms a portion of actuator mechanism 90, which is slidably housed in bore 92 of cap 14. Actuator mechanism 90 also includes an actuator valve 94 formed by recess 96 between "O" ring seals 98 and 100. Actuator valve 94 vents control chamber 42 through port 102 into auxiliary chamber 68 when actuator handle 16 is pressed inwardly, to the left in FIG. 2. Actuator mechanism 90 also includes biasing means, spring 104, which urges handle 16 to the right and actuator valve 94 to the closed position. A breather hole 106 is provided in cap 14 to prevent excessive back pressure from building up as a result of the sealing function of "O" ring 105 when actuator handle 16 is moved inwardly.

Actuator control mechanism 110 includes locking member 112 which is biased downwardly by means of spring 114, and reset member 116, which is received in recess 118 in actuator handle 16.

Figures 3, 4, 6, 7, 8, 10, 11:
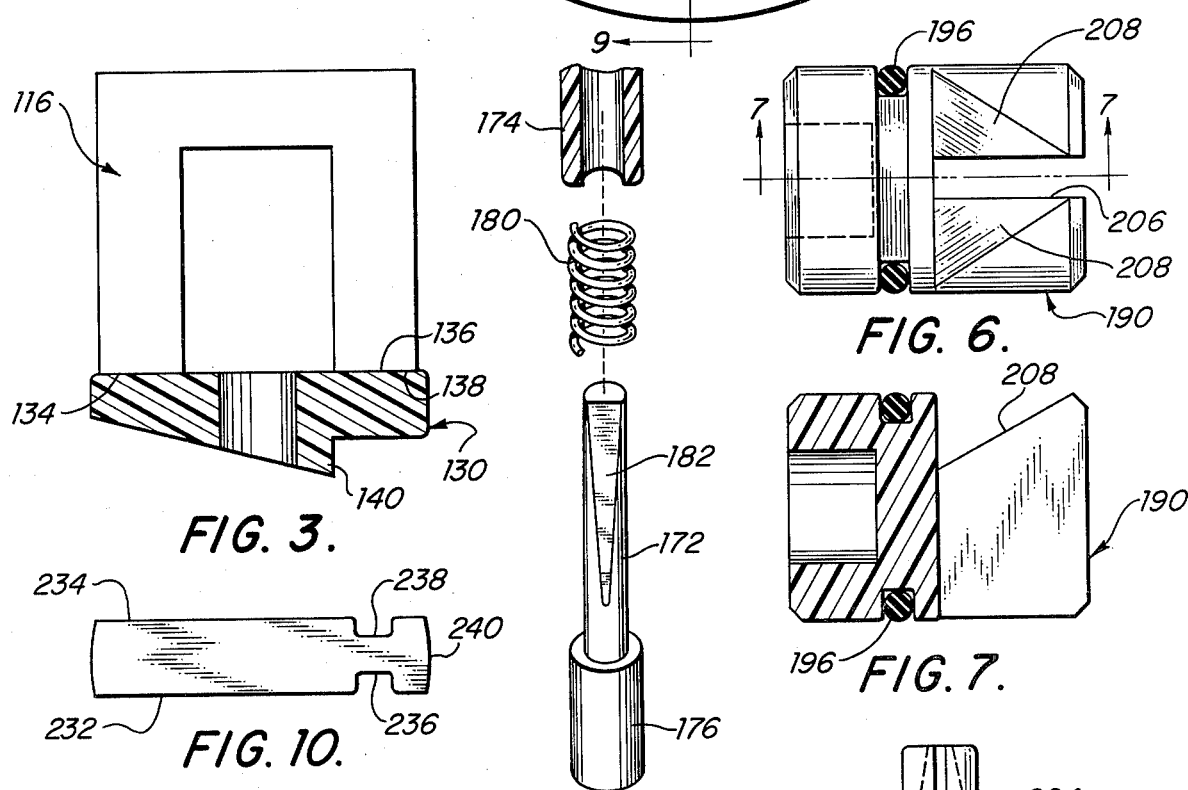
FIG. 3 is a sectional view of a follower member driven with the partition and a reset member resting on the follower member.
FIG. 4 is an exploded view of the metering mechanism shown in FIG. 2.
FIG. 6 is a plan view of the double-acting metering piston in FIG. 5.
FIG. 7 is a sectional view taken along line 7—7 of FIG. 6.
FIG. 8 is a side view of the metering rod which cooperates with the double-acting metering piston in FIG. 5.
FIG. 10 is a plan view of a cam member in the compensating mechanism illustrated in FIG. 9.
FIG. 11 is a sectional view of the compensating piston used in the compensating mechanism illustrated in FIG. 9.
Figure 12:
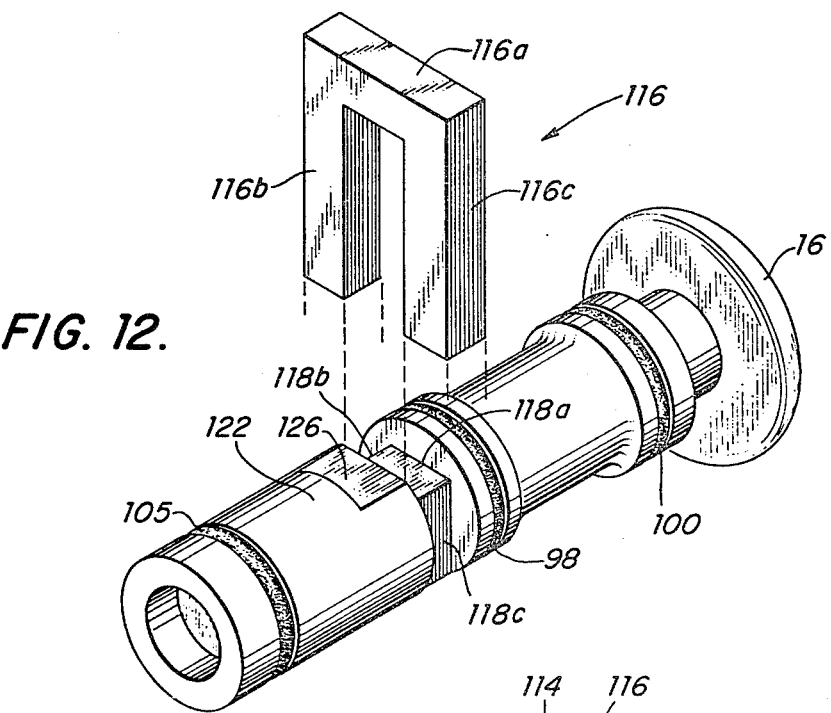
FIG. 12 is an axonometric view of a portion of the actuator mechanism and actuator control mechanism.

Reset member 116 slides along the top surface of follower member 130 when actuator handle 16 moves left and right, FIG. 3; reset member 116 has its lower ends 134 and 136 resting on the upper surface 138 of follower member 130. The lower extension 140 of follower member 130 fits in slot 142, FIG. 2, of slide 46. Reset member 116 includes a top portion 116a and two legs 116b, 116c, FIG. 12, which are received in top channel 118a and side channels 118b, 118c, respectively, of recess 118 in handle 16. Thus member 116 is retained by channels 118b, c, to move with handle 16 even when member 116 is driven upward and portion 116a is clear of channel 118a.

When actuator handle 16 is moved to the left to open actuator valve 94 and vent control chamber 42 through port 102 into auxiliary chamber 68, reset member 116 moves out from under portion 120 of locking member 112, and shoulder 122 moves to the left, clear of detent 124 which, under the urging of spring 114, is pressed into recess 126, where it abuts against shoulder 122. Thus actuator handle 16 is locked in that position with actuator valve 94 in the open position. When subsequently partition 44 moves upwardly, moving valve element 56 to open outlet port 21, the upper end of slide 46, either directly, or indirectly through an intermediate member such as follower member 130, contacts the lower end of reset member 116 and moves it upwardly; this drives locking member 112 upwardly against the force exerted by spring 114, lifting detent 124 out of recess 126, clear of shoulder 122, thereby permitting actuator handle 16 to return to the normal position with actuator valve 94 in the closed position.

This movement produced by the retraction of detent 124 is sufficient for "O" ring 98 to reestablish a seal with bore 92 and close actuator valve 94. Subsequently, when the outlet port is closed by valve element 56 as partition 44 descends, reset member 116 is permitted to drop, as a result of the descent of follower member 130 and/or slide 46, so that reset member 116 gradually moves down along inclined surface 132 of locking member 112 until it resumes its initial position as shown in FIG. 2.

Initially, an inlet line connected to inlet extension 22 provides flushing fluid such as water at inlet port 20. This water moves through hole 74, pushing resilient washer 76 out of the way and entering chamber 42. Finally, when control chamber 42 is full, the pressure, plus the urging of spring 78 on washer 76, seals hole 74 so that further transfer at the present inlet pressure of water between primary chamber 40 and control chamber 42 is not possible. In this condition flush valve 10 is fully operational and awaiting actuation. The pressure in control hamber 42 urges partition 44 downward so that "O" ring 58 seals against seat 62 to close outlet port 21. In this condition, a sudden vacuum occurring at inlet extension connection 22 produces a negative pressure in hole 74 with respect to the pressure in control chamber 42 so that washer 76, performing as a unidirectional valve, is caused to even more tightly seal hole 74 and even more strongly force "O" ring seal 58 against seat 62 to more securely close the outlet port 21 and prevent any siphoning effect which might draw water from the water closet up through the outlet port 21 and back into the supply line connected at inlet extension 22. Thus flush valve 10 includes as an integral part an anti-siphon feature which seals the outlet port even more strongly when the line pressure decreases or virtually disappears.

The unidirectional valve constituted by resilient washer 76 also preforms a second function: it acts as an anti-surge valve to prevent sudden increases in pressure from accidentally, unwantedly actuating flush valve 10. Surges occur when the pressure at inlet port 20 is re-established following a siphoning condition or when normal pressure in the line is suddenly exceeded by a sudden surge of increased pressure. In either case, the sudden increase of pressure is communicated immediately, directly through hole 74, where it pushes resilient washer 76 out of the way and enters control chamber 42, increases the pressure that is pressing downward on partition 44, and provides increased sealing force for valve element 56 at outlet port 21. Thus upon the appearance of this excess pressure or surge the valve is only closed more tightly, and upon its disappearance the increased pressure now stored in control chamber 42 continues the increased sealing pressure, which keeps closed outlet port 21.

Figure 13:
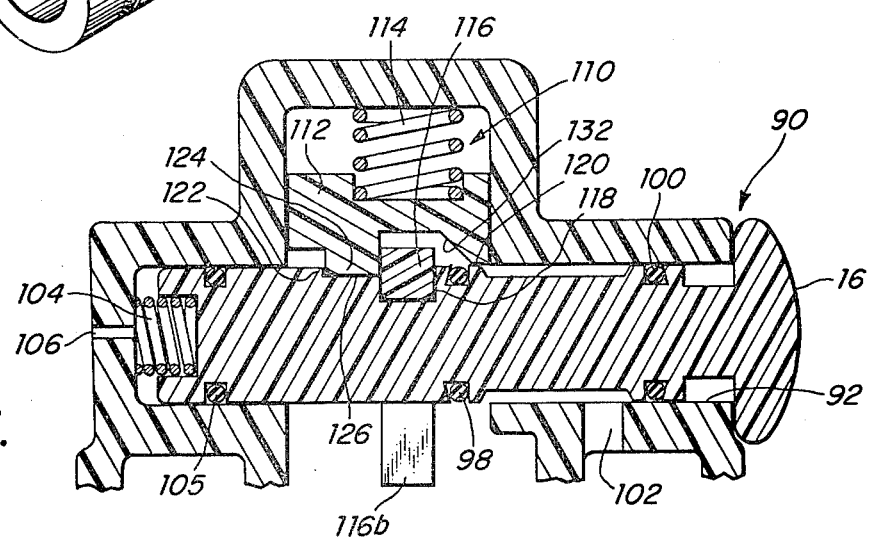
FIG. 13 is a sectional view of parts of the actuator control mechanism and actuator mechanism upon actuation of the valve.
Figure 14:
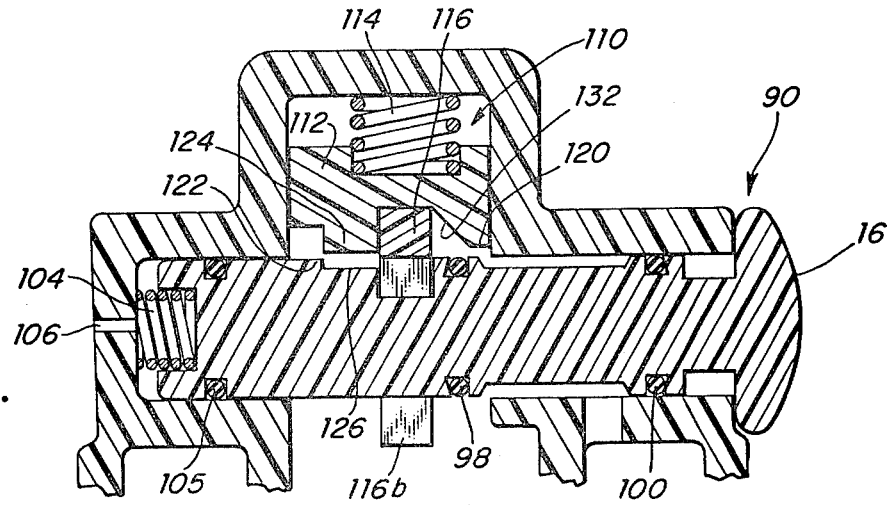
FIG. 14 is a sectional view similar to FIG. 13 after opening of the valve as the actuator mechanism begins to reset.

In operation, the user presses actuator handle 16 inwardly against the force of spring 104 only, and does not need to oppose line pressure or any substantial component of line pressure. Upon actuator handle 16 being moved inwardly, to the left in FIG. 2, actuator valve 94 is opened so that control chamber 42 vents through port 102 into auxiliary chamber 68. At this point shoulder 122 has cleared detent 124, FIG. 13 and detent 124 has descended and is holding actuator handle 16 in the actuated position, whereby actuator valve 94 is in the open position. The venting of the water in control chamber 42 into auxiliary chamber 68 decreases the pressure on partition 44 and permits the line pressure in primary chamber 40 to move the partition 44 upwardly. This movement moves reset member 116 upwardly and drives locking member 112 upwardly against the force exerted by spring 114, lifting detent 124 out of recess 126 and clear of shoulder 122, FIG. 14. Spring 104 now urges handle 16 with member 116 to the right.

As partition 44 moves upwardly, valve element 56 moves off seat 62 and the flow begins from inlet port 20 to outlet port 21, instituting the flushing action. The height to which partition 44 rises, and thus the size of the opening which is provided between valve element 56 and outlet port 21, is in part controlled by duct 67, which restricts the flow of water from auxiliary chamber 68 and thereby limits somewhat the height to which partition 44 rises and the extent to which port 21 is opened by the movement of partition 44. As the flushing action continues, water from primary chamber 40 is driven through hole 74, past resilient washer 76 into control chamber 42, which is now at much lower pressure. As control chamber 42 begins to fill and the downward force on partition 44 increases, partition 44 begins to move downwardly, restricting to an even greater degree the opening between valve element 56 and outlet port 21 and permitting follower 130 to drop down with slide 46 and re-assume their initial positions. As follower 130 drops member 116 is urged to drop by member 112 under force of spring 114. The force of springs 104 and 114 urge member 116 to the right and down, respectively. The upper right hand corner of member 116 slides down along surface 132. Finally, valve element 56 closes outlet port 21, control chamber 42 once again has its pressure equalized with that of primary chamber 40, actuator handle 16 is in its normal position, as shown in FIG. 2, and flush valve 10 is once again ready for operation.

According to this invention, flow control mechanism 160, FIG. 2, includes auxiliary chamber 68; flow regulating outlet, duct 67; and flow regulating inlet, which may include a number of holes 162 which pass through locking plate 60 and flow regulator member 64 and interconnect outlet port 21 with auxiliary chamber 68. The flow control mechanism also includes a unidirectional valve, resilient member 164, which is urged downwardly to close holes 162 by means of a biasing device, spring 166, which presses on washer 168.

Flow control mechanism 116 also includes metering mechanism 170, that includes tapered metering rod 172, FIGS. 2 and, which extends into hole 74 provided with extension 174 and which has its head 176 biased downwardly against surface 178 of base 18 by means of a biasing device such as spring 180. Due to the tapered surface 182, the space between tapered surface 182 and extension 174 becomes more restricted as partition 44 descends on metering rod 172 and metering rod 172 penetrates more deeply into extension 174. The space becomes less restrictive when partition 44 rises and metering rod 172 withdraws from extension 174.

The operation of actuator member 16 opens actuator valve 94 and vents control chamber 42 into auxiliary chamber 68. Partition 44 immediately rises in response to the pressure applied to the underside of partition 44. With valve element 56 retracted, outlet port 21 is in direct communication with inlet port 20, and the flushing cycle begins. As the water rushes from inlet port 20 to outlet port 21, a portion of it moves upward through holes 162, overcomes the force of spring 166, and drives resilient member 164 out of the way as the water enters auxiliary chamber 68. The amount of water, and the speed with which it enters auxiliary chamber 68 through holes 162, depends upon the line pressure at inlet port 20. The higher this pressure, the greater is the flow rate through holes 162 into auxiliary chamber 68. As the flow rate into auxiliary chamber 68 increases, so too does the pressure in auxiliary chamber 68 which opposes the line pressure applied to the underside of partition 44 and which tends to drive partition 44 upward. This increased line pressure at inlet port 20 tends to increase the pressure in auxiliary chamber 68 to counterbalance the increase on the lower portion of partition 44 and thereby limit the ascent of partition 44. This limiting of the ascent necessarily limits the opening between seal 58 and seal 62. Thus as the line pressure increases at inlet port 20, tending to increase the flow rate through outlet port 21, there is a decrease in the size of the opening provided by the lifting of valve element 56, which tends to decrease the flow rate through outlet port 21. Thus a substantially constant flow rate is maintained through outlet port 21 irrespective of variations in line pressure at inlet port 20.

Simultaneously with this action, the differential in pressure between control chamber 42 and primary chamber 40, insofar as it controls the ascent of partition 44, also necessarily controls the retraction of metering rod 172 from extension 174. At low line pressure at inlet port 20, partition 44 approaches maximum ascent and metering rod 172 approaches maximum retraction, so that the space between it and extension 174 is at a maximum and water can flow from primary chamber 40 at a predetermined flow rate into control chamber 42 at the lower line pressure. At the higher pressure, partition 44 approaches a minimum ascent and rod 172 approaches maximum insertion in extension 174. The space between rod 172 and extension 174 approaches minimum size so that approximately the same predetermined flow rate is maintained at this higher pressure, too. The greater opening provided by metering rod 172 at the lower pressure and the smaller opening at the higher pressure results in a uniform filling rate for control chamber 42 and thus stabilizes the flush cycle time of valve 10 independent of line pressure variations.

Figure 5:
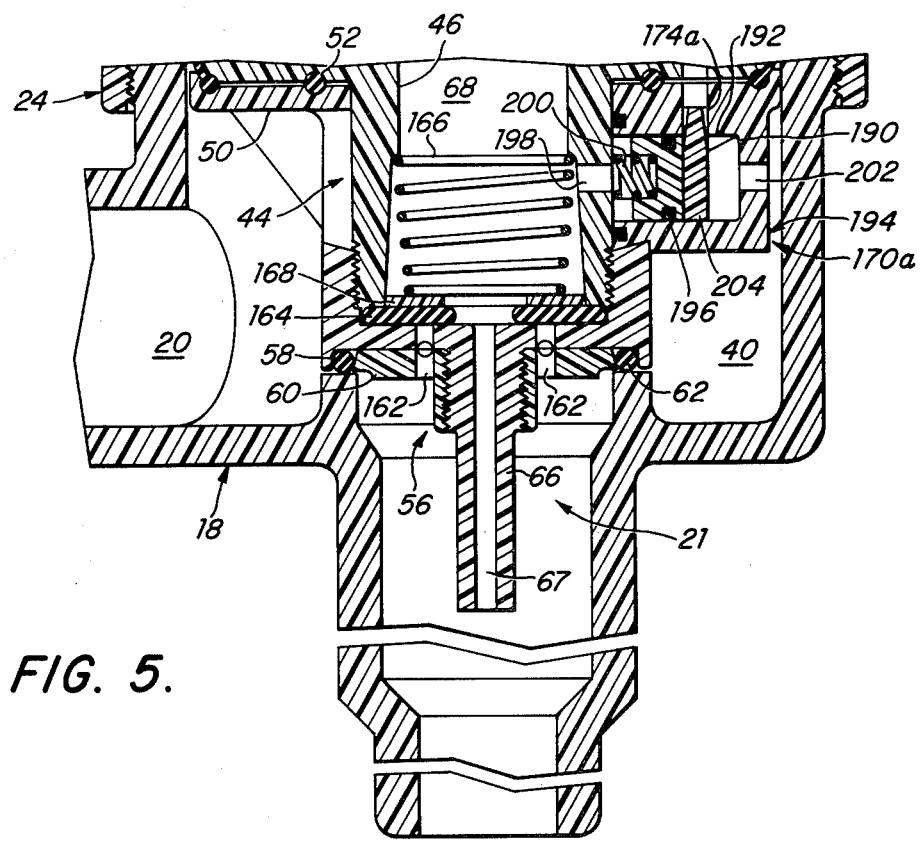
FIG. 5 is a sectional diagram of the lower portion of flush valve 10 as shown in FIG. 2, with slight modifications illustrating an alternative metering mechanism.

An alternative metering mechanism 170a, FIG. 5, includes double-acting piston 190, slidable in bore 192 of compartment 194 and sealed to bore 192 by means of "O" ring 196. Piston 190 is subject to pressure in auxiliary chamber 68 through hole 198 in slide 46, and is biased away from slide 46 by means of spring 200. The other end of piston 190 is subject to the pressure in primary chamber 40 through hole 202 in compartment 194. As piston 190 moves to and fro in bore 192 as a function of the differential pressure between auxiliary chamber 168 and primary chamber 40, it moves tapered metering rod 204 in and out of extension 174a.

Double-acting metering piston 190 includes a slot 206, FIG. 6, which receives the lower end of metering rod 204. On either side of slot 206, piston 190 contains inclined surfaces 208, FIG. 7, on which rides inclined surface 210, FIG. 8, of metering rod 204. As the pressure in auxiliary chamber 68 increases with respect to that in primary chamber 40, piston 190 moves to the right, retracting metering rod 204 as it slides to the lower porton of inclined surface 208. In contrast, when the pressure in primary chamber 40 begins to exceed that in auxiliary chamber 68, piston 190 is driven to the left so that metering rod 204 rises up inclined surface 208 and penetrates farther into extension 174a. Thus the repressurizing or refilling of control chamber 42 is accomplished in the same way with metering mechanism 170a as it was with metering mechanism 170.

Figure 9:
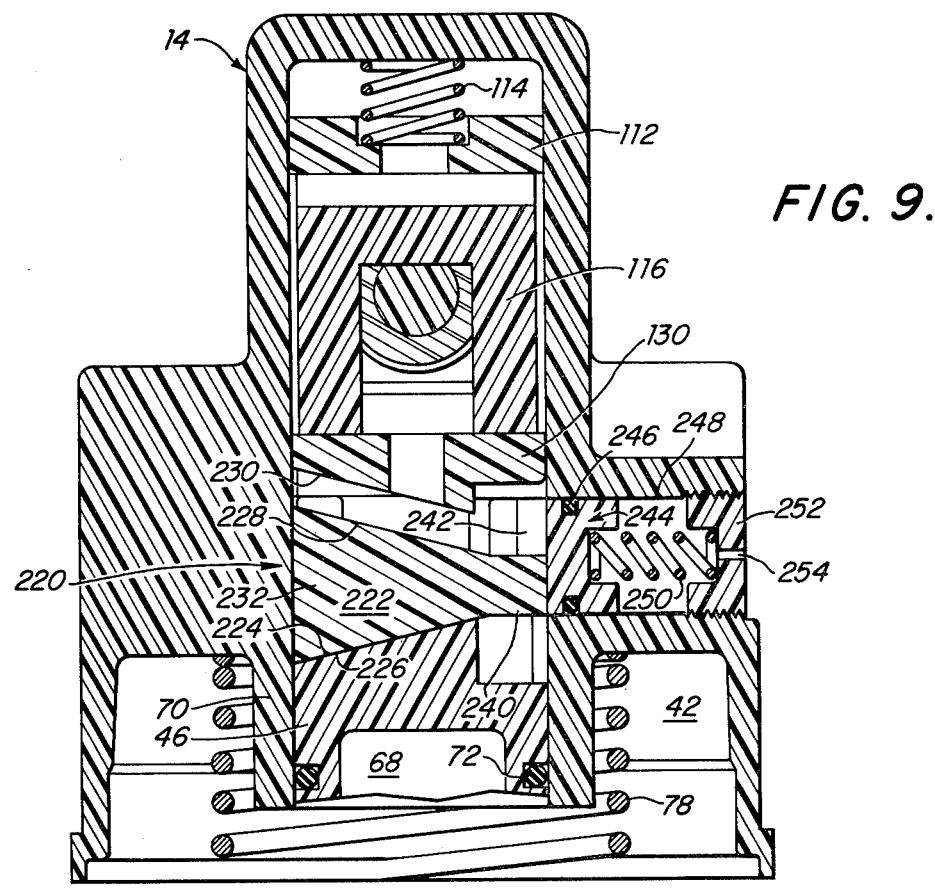
FIG. 9 is a cross-sectional diagram of the upper portion of a flush valve similar to FIG. 2 taken along line 9—9 of FIG. 1, showing the compensator mechanism according to this invention.

Although flush valve 10 is performing a fully functional flush cycle, slide 46 and partition 44 may ascend to different heights, as controlled by holes 162, valve 164 and duct 67, in response to the pressure provided at inlet port 20. The lower the pressure, the higher is the ascent of slide 46. Thus some adjustment is required so that whatever the final height of ascent of slide 46 there is sufficient travel imparted to reset member 116, FIG. 9, to permit it to disengage locking member 112 and permit actuator member 16 to reset actuator valve 94 to the closed position. For this purpose, compensating mechanism 220, FIG. 9, is provided and includes double-sided cam member 222, whose lower cam surface 224 rides on a mating inclined surface 226 in slot 142, FIG. 2, of slide 46. The upper cam surface 228 bears on inclined surface 230 of follower member 130, FIG. 9. Cam member 222 is narrow with flat, parallel sides 232, 234, FIG. 10, with a notch 236, 238 on each side near the smaller end 240.

These notches 236 and 238 and the small end 240 are received in a similarly shaped recess 242, FIG. 11, of compensating piston 244 which, with its "O" ring 246, is slidably received in bore 248, FIG. 9. Compensating piston 244 is biased outwardly toward cam member 222 by spring 250, which is mounted in plug 252 having breather hole 254 to prevent back pressure when piston 244 moves toward plug 252. As the pressure in auxiliary chamber 68 increases, it drives piston 244 inwardly against the force of spring 250. As piston 244 moves inwardly, it draws with it cam member 222. As cam member 222 moves laterally to the right with piston 244 upon increasing pressure in auxiliary chamber 268, its wider end increases the longitudinal driving distance between slide 46 and follower member 130, or more specifically, between inclined surface 226 of slide 46 and inclined surface 230 of follower member 130.

When the line pressure at inlet port 20 is high, pressure in auxiliary chamber 68 is also high. This elevated pressure in auxiliary chamber 68 tends to drive piston 244 to the right and draw cam member 222 with it. This allows cam member 222 to increase the longitudinal drive distance between inclined surfaces 226 and 230 so that even through partition 44 ascends to a lower level with increased line pressure, that lower level is nevertheless sufficient to raise member 116 and disengage locking member 112.

Conversely, when the line pressure at inlet port 20 decreases and the pressure in auxiliary chamber 68 does likewise, piston 244 moves outwardly and drives cam member 222 laterally to the left, thereby decreasing the longitudinal drive distance between inclined surfaces 226 and 230, to accommodate the higher ascendancy of slide 46 of partition 44 in operating reset member 116.

Other embodiments will occur to those skilled in the art and are within the following claims:

What is claimed is:

1. In a flush valve having a housing, a moveable partition sealingly engaging the housing and defining a primary chamber and a control chamber, an inlet port in the primary chamber and an outlet port in the primary chamber, a valve element connected with the partition for closing the outlet port, an actuator mechanism including an actuator valve for venting said control chamber and an actuator member for operating the actuator valve, the improvement comprising:
   a flow control mechanism including an auxiliary chamber communicating with said control chamber through said actuator valve; a flow regulating outlet communicating with said outlet port and said auxiliary chamber for discharging fluid vented through said actuator valve; a flow regulating inlet in said auxiliary chamber for conducting into said auxiliary chamber, when said flush valve is open and said valve element is separated from said outlet port, a portion of the fluid passing from said inlet port to said outlet port; and a unidirectional flow regulator valve for permitting fluid flow through said flow regulating inlet into said auxiliary chamber but preventing fluid flow through said flow regulating inlet out of said auxiliary chamber.

2. The flush valve of claim 1 in which said unidirectional flow regulator valve includes a resilient material mounted in said auxiliary chamber covering said flow regulating inlet.

3. The flush valve of claim 2 in which said unidirectional flow regulator valve includes first biasing means urging said resilient material toward the closed position.

4. The flush valve of claim 1 in which said flow control mechanism further includes a metering mechanism interconnected with said passage between said control chamber and said primary chamber for controlling flow through said passage as a function of the differential in pressure between said primary chamber and said auxiliary chamber.

5. The flush valve of claim 4 in which said metering mechanism includes a tapered metering rod slidable in said passage in response to movement of said partition and second biasing means for holding said metering rod in fixed relationship to said housing and urging said metering rod out of said passage.

6. The flush valve of claim 4 in which said metering mechanism includes a double-acting metering piston having one end subject to the pressure in said primary chamber and the other end subject to the pressure in said auxiliary chamber, and a metering rod slidable in said passage for controlling flow through said passage in response to the pressure differential between said primary and auxiliary chambers.

7. The flush valve of claim 1 further including an actuator control mechanism reponsive to motion of said partition as said valve element moves away from said outlet port, for driving said actuator mechanism to reset said actuator valve to the closed position and cease venting said control chamber.

8. The flush valve of claim 7 further including a compensator mechanism, for operating said actuator control mechanism over a predetermined range of pressure at said inlet port, including a follower member for driving said actuator control mechanism, a cam member for driving said follower member and driven by motion of said partition, and a compensating piston responsive to the pressure in said auxiliary chamber to control the lateral positioning of said cam member for adjusting the longitudinal driving distance between said follower member and said partition.

* * * * *